April 2, 1963   C. W. FINKL   3,084,038
METHOD AND APPARATUS FOR COMBINED STREAM AND LADLE DEGASSING
Filed Nov. 25, 1959   6 Sheets-Sheet 1

INVENTOR.
Charles W. Finkl,
BY Parker & Carter
Attorneys.

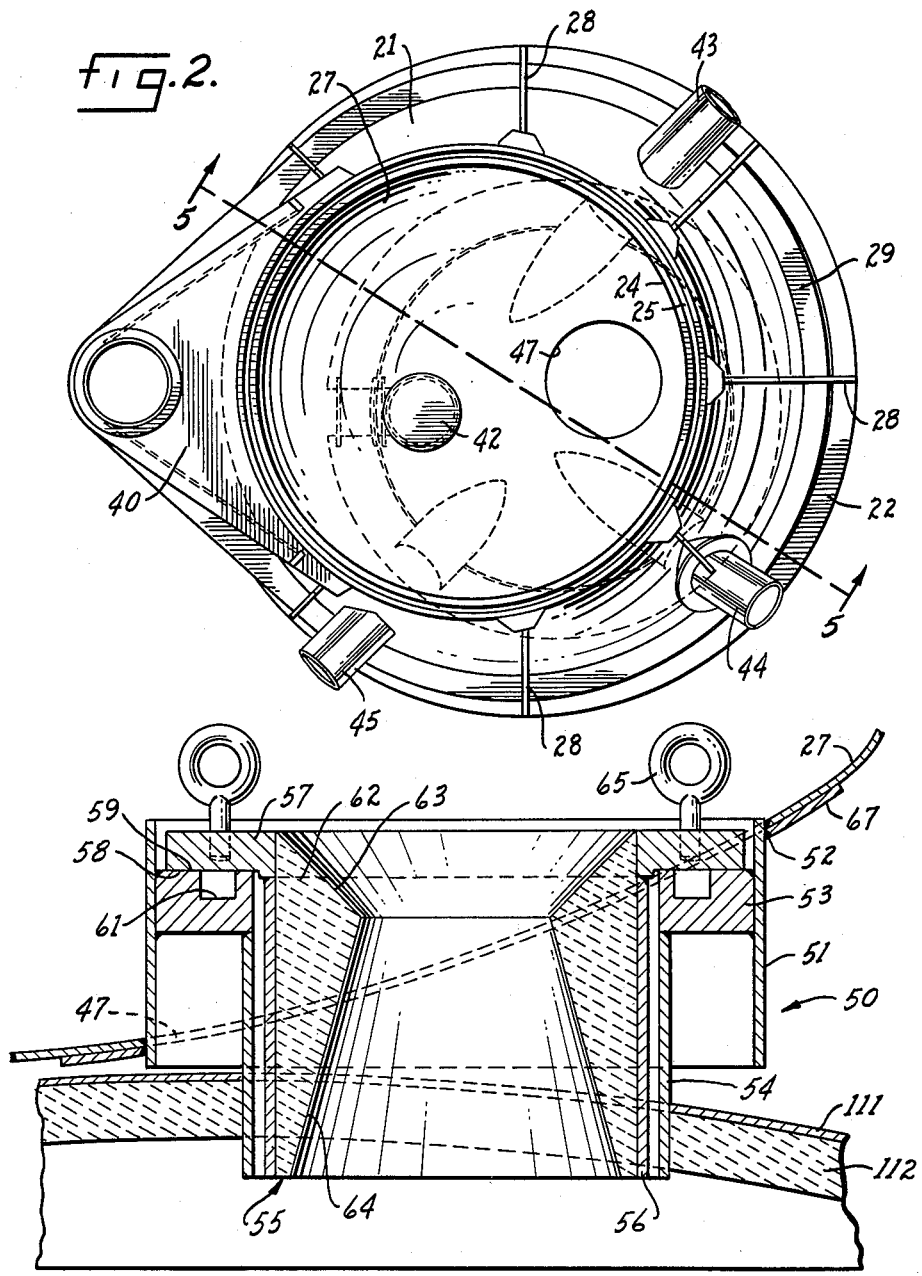

April 2, 1963 C. W. FINKL 3,084,038
METHOD AND APPARATUS FOR COMBINED STREAM AND LADLE DEGASSING
Filed Nov. 25, 1959 6 Sheets-Sheet 3
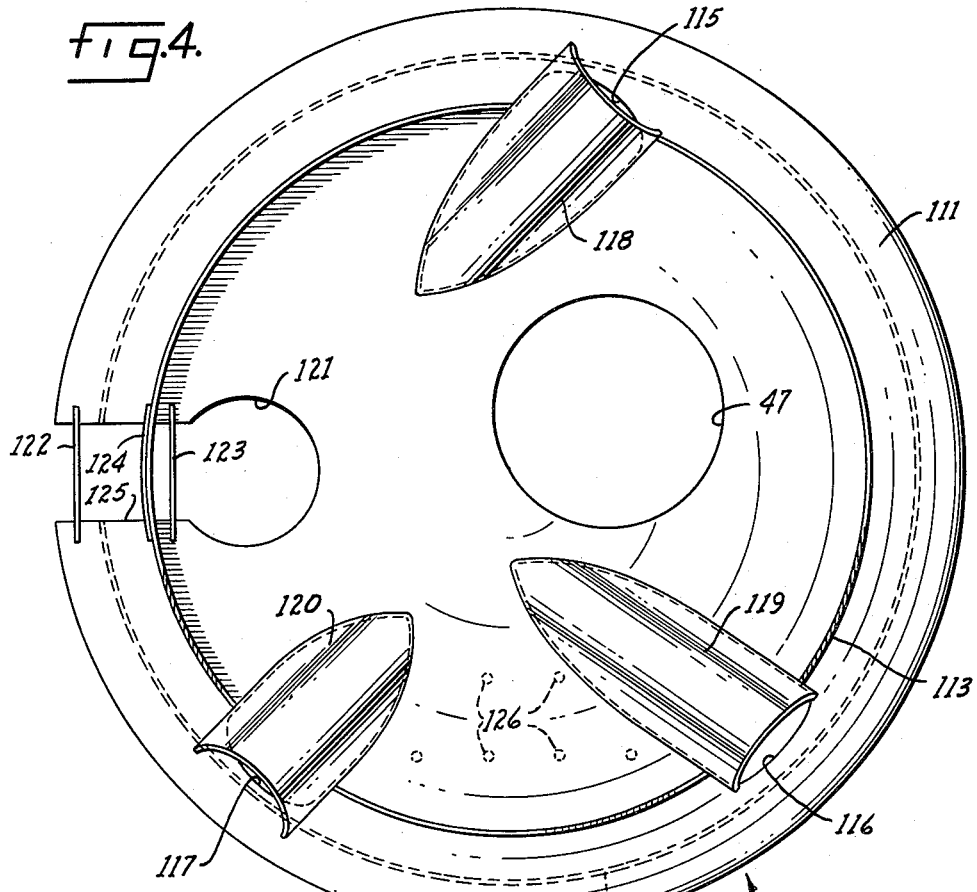
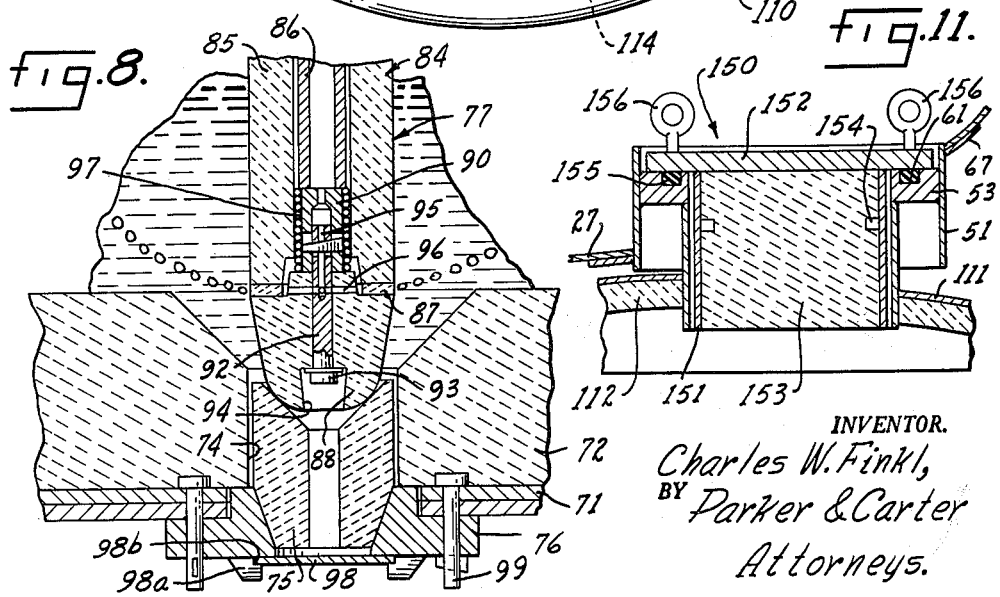
INVENTOR.
Charles W. Finkl,
BY Parker & Carter
Attorneys.

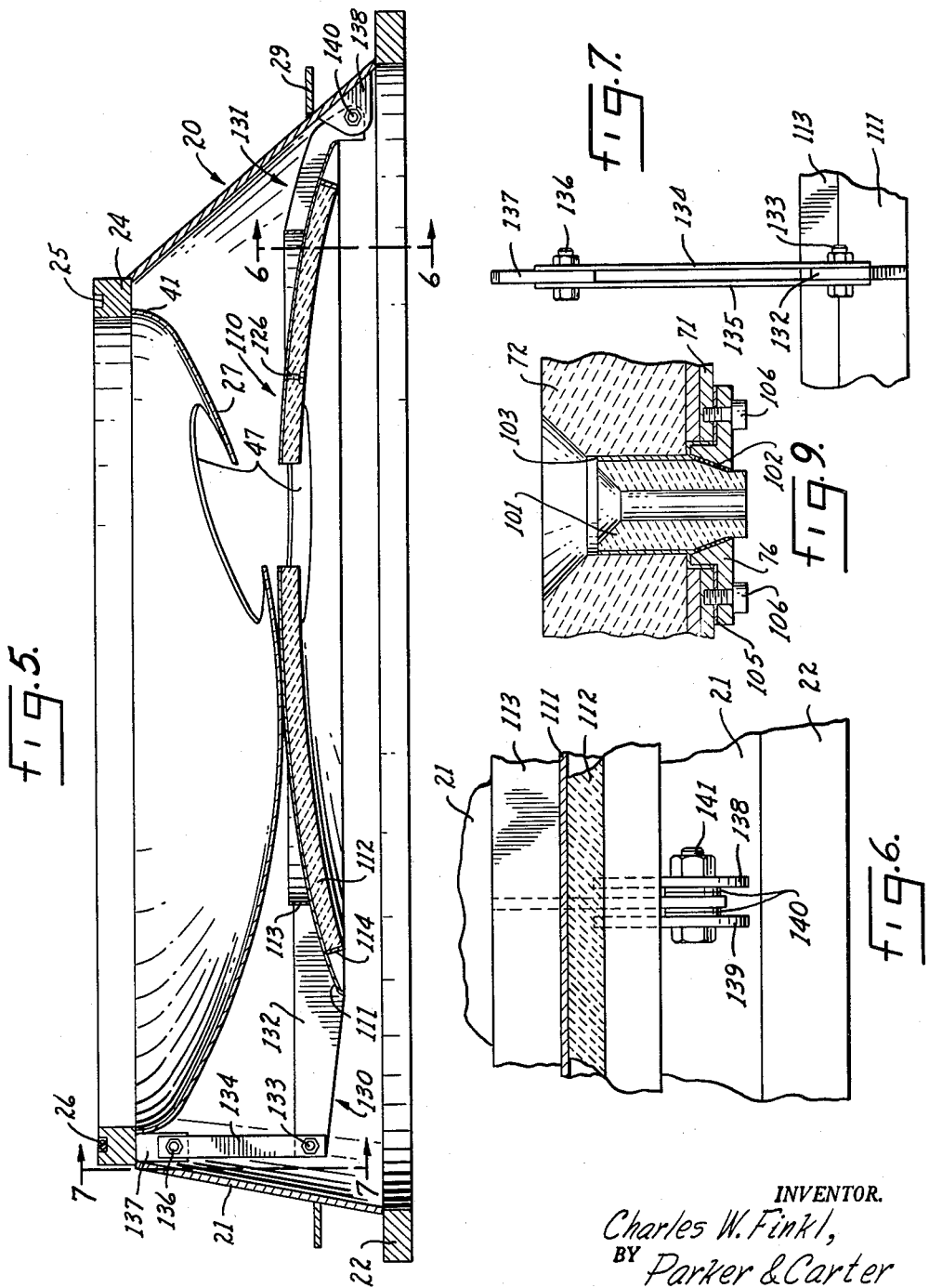

April 2, 1963  C. W. FINKL  3,084,038
METHOD AND APPARATUS FOR COMBINED STREAM AND LADLE DEGASSING
Filed Nov. 25, 1959  6 Sheets-Sheet 5

INVENTOR.
Charles W. Finkl,
BY Parker & Carter
Attorneys.

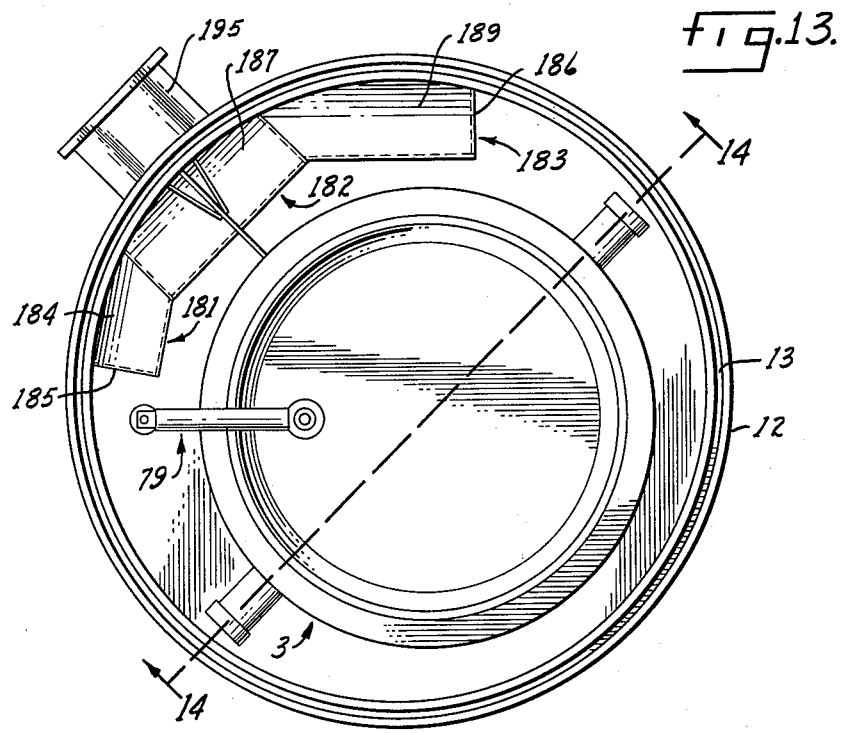
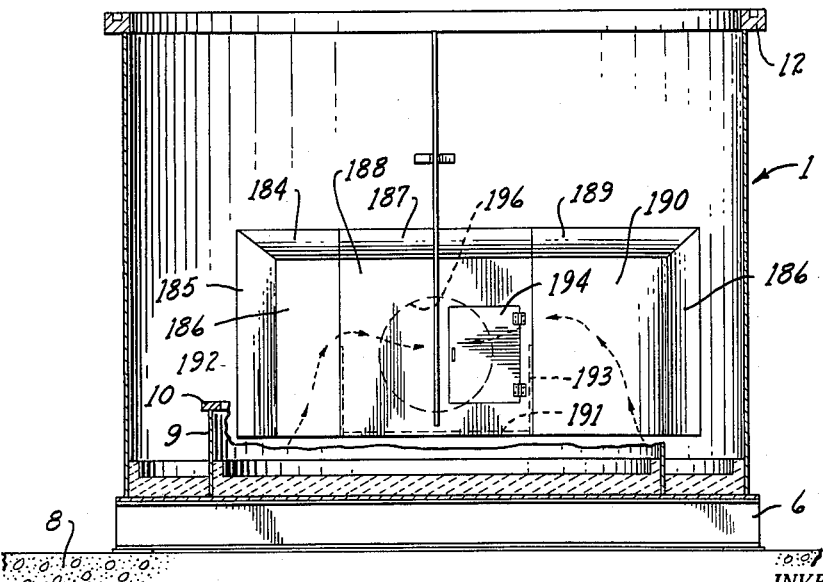

3,084,038
METHOD AND APPARATUS FOR COMBINED STREAM AND LADLE DEGASSING

Charles W. Finkl, Chicago, Ill., assignor to A. Finkl & Sons Company, Chicago, Ill., a corporation of Illinois
Filed Nov. 25, 1959, Ser. No. 855,442
11 Claims. (Cl. 75—49)

This invention relates generally to methods and apparatus for refining molten metal, and particularly to methods and apparatus for degassing molten metals such as ferrous alloys.

Many methods of refining molten metals, particularly ferrous alloys, are well known. Among these are flow degassing, chamber degassing, ladle degassing, ladle purging, and, more recently, ladle vacuum purging.

This latter process is described in my copending application, Serial No. 777,664, entitled "Method of and Apparatus for Degassing Molten Metals," filed December 2, 1958, of which this application is a continuation-in-part. Basically this process, as disclosed in my aforesaid copending application, comprises the steps of bubbling a purging agent, such as purging gas, upwardly through a ladle of molten metal while the ladle is subjected to a vacuum to remove deleterious gases. As shown in my copending application, the purging agent is bubbled upwardly through a melt from the bottom portion of a receptacle containing the melt, specifically the bottom, or an admission conduit immersed in the melt a substantial distance below the surface thereof.

Another method of refining molten metals which has been known for some years is stream degassing. This process, which is illustrated for example in B. E. L. De Mare Patent No. 2,253,421, essentially comprises subjecting a stream of molten metal to a vacuum as it passes from one container to another. Usually, a ladle containing molten metal to be refined is placed on top of a vaccum chamber containing a receiving ladle. An air tight pouring sleeve assembly forms a flow path between the top or supply ladle and the tank ladle. After the supply ladle is properly positioned and the chamber containing the tank ladle has been evacuated to a sufficiently low value, the stopper rod in the supply ladle is lifted and the metal cascades downwardly through the pouring sleeve assembly. The impact of the stream of metal ruptures the seal formed within the pouring sleeve assembly. As the molten metal passes into the tank ladle and is collected there, it is exposed to the vacuum. The deleterious gases, such as oxygen, nitrogen and, particularly, hydrogen, all or some of which may be in solution or in physical mixture within the metal, migrate to the surface of the downwardly flowing metal and into the vacuum. The gradually rising surface of the molten metal in the tank ladle is continually exposed to the vacuum so that the metal is acted upon both during its time of travel from ladle to ladle and while in the tank ladle.

The stream degassing method has many inherent advantages, but special equipment and special handling procedures and techniques must be utilized if these inherent advantages are to be consistently realized.

One drawback to the conventional stream degassing process, for example, is the high cost of preparing the equipment for each heat. In the conventional installation, a thin, flexible, rupture disc is positioned within the pouring sleeve assembly across the aperture through which the stream of molten metal flows. The rupture disc maintains the vacuum tank air tight so that it may be evacuated to a sufficiently low valve before molten metal is admitted. Installation of the rupture disc is a time-consuming operation since the entire pouring sleeve assembly must be allowed to cool to handling temperature between heats. In addition to the labor and material cost involved, the equipment is taken out of operation for extended periods of time.

The use of a rupture disc may also affect the end product. The rupture disc is generally fabricated from aluminum, and when it ruptures under the impact of the flowing stream, it may add an unwanted alloying element to the metal undergoing treatment. In addition, maintenance of a vacuum-tight joint about the disc seat is a continual problem since the splattering of metal wears away the seat.

Another drawback to conventional stream degassing is the space requirements needed for its practice. In order to provide adequate time for the vacuum to act on the individual droplets as the metal passes from ladle to ladle, the supply ladle must be elevated a substantial distance above the tank ladle. This necessitates considerable head room which is not available in many existing plants.

Another problem that has prevented stream degassing from becoming more widely accepted is the fact that special precautions must be taken to avoid erosion and washing away of the refractory surrounding the discharge nozzle of the supply ladle. It is now common practice in the industry to form a dam or a dike about the discharge outlet from the supply ladle as illustrated for example in the Coupette et al., Patent No. 2,784,961, to overcome this problem. Although this procedure is satisfactory in many instances, it requires special handling which increases the cost of the operation and takes the ladle out of service for an extended period when the dam or dike is periodically renewed.

One of the most serious drawbacks to wide-spread use of the process as now practiced is its lack of versatility. The equipment now in use is almost invariably adapted for the practice of this process only. Since the equipment is rather costly, producers of small quantities of stream degassed steel have not widely adopted it since it is not economical to use the equipment only intermittently. Present equipment is usually not suitable for alternate ingot and ladle stream-degassing or ladle degassing and stream degassing.

If present equipment was more versatile, the problem of temperature drop frequently encountered in ladle to ladle stream degassing would not arise. As the metal hits the tank ladle it is cooled since the temperature in the tank will usually be at or only slightly above room temperature. This temperature drop is not serious in extremely large heats, but can have adverse effects, such as a decrease in fluidity, in small and medium sized heats. If present stream degassing equipment were adaptable to ladle degassing processes, the equipment could be kept in continuous use with the large heats being stream degassed and the small heats ladle degassed.

Accordingly, the primary object of this invention is to provide a combination ladle stream degassing process for the treatment of molten metals, and particularly ferrous alloys.

Another object is to provide a unique stream degassing process which does not pick up unwanted alloying elements during operation.

Another object is to provide a unique stream degassing process which is considerably more efficient than conventional processes by fanning out the flowing stream of molten metal between the supply and tank ladle to thereby more completely expose the droplets to vacuum.

Another object is to provide a metal refining apparatus useful for either ladle or combination ladle and stream degassing processes including ladle degassing, ladle degassing and purging, stream degassing, stream degassing and ladle purging, ingot stream degassing, and ingot purging and stream degassing.

Yet a further object is to provide a stream degassing apparatus which eliminates the conventional dam or dike and its attendant maintenance and replacement problems about the discharge nozzle of the supply ladle.

A further object is to provide a unique pouring sleeve assembly which facilitates fanning out of the stream of metal as it flows from the supply ladle to the tank ladle.

Yet another object is to provide a transition section for a stream degassing apparatus which provides a base for the supply ladle and a partial cover for the tank ladle during stream degassing, and a sealing cover for the tank ladle during ladle degassing operations.

Still another object is to provide a method for controlling the processing temperature of molten metal in a tank ladle by reducing the radiation heat loss from the ladle.

Yet a further object is to provide a radiation cover shield for a tank ladle in a vacuum degassing process which materially reduces the radiation heat loss from the molten metal in the ladle.

Yet another object is to provide a process and apparatus for stream degassing in low head room plants.

Yet a further object is to provide a stream degassing apparatus which may be quickly converted to ladle degassing by merely replacing the pouring sleeve in the pouring sleeve assembly by a sealing plug.

Other objects and advantages of the invention will become apparent from the following description taken in connection with the accompanying drawings wherein by way of illustration and example certain embodiments of the invention are set forth.

The invention is illustrated more or less diagrammatically in the accompanying drawings, wherein:

FIGURE 2 is a top plan view of the transition section taken substantially along the line 2—2 of FIGURE 1;

FIGURE 3 is a detailed sectional view of the transition section pouring sleeve assembly of FIGURE 1 on a larger scale;

FIGURE 4 is a top plan view of the radiation shield taken substantially along the line 4—4 of FIGURE 1;

FIGURE 5 is a section taken substantially along the line 5—5 of FIGURE 2;

FIGURE 6 is a sectional view showing details of the radiation shield attachment brackets taken substantially along the line 6—6 of FIGURE 5;

FIGURE 7 is an end view of a typical radiation shield hanger bracket taken substantially along the line 7—7 of FIGURE 5;

FIGURE 8 is a detailed sectional view of the assembly of FIGURE 1 on a larger scale;

FIGURE 9 is an enlarged view of the supply ladle nozzle assembly;

FIGURE 11 is a partial sectional view illustrating a pouring sleeve plug in position for ladle degassing;

FIGURE 13 is a sectional view with parts omitted for purposes of clarity taken substantially along line 13—13 of FIGURE 10; and FIGURE 14 is a sectional view with parts omitted for purposes of clarity taken substantially along the line 14—14 of FIGURE 13.

Figure 1:
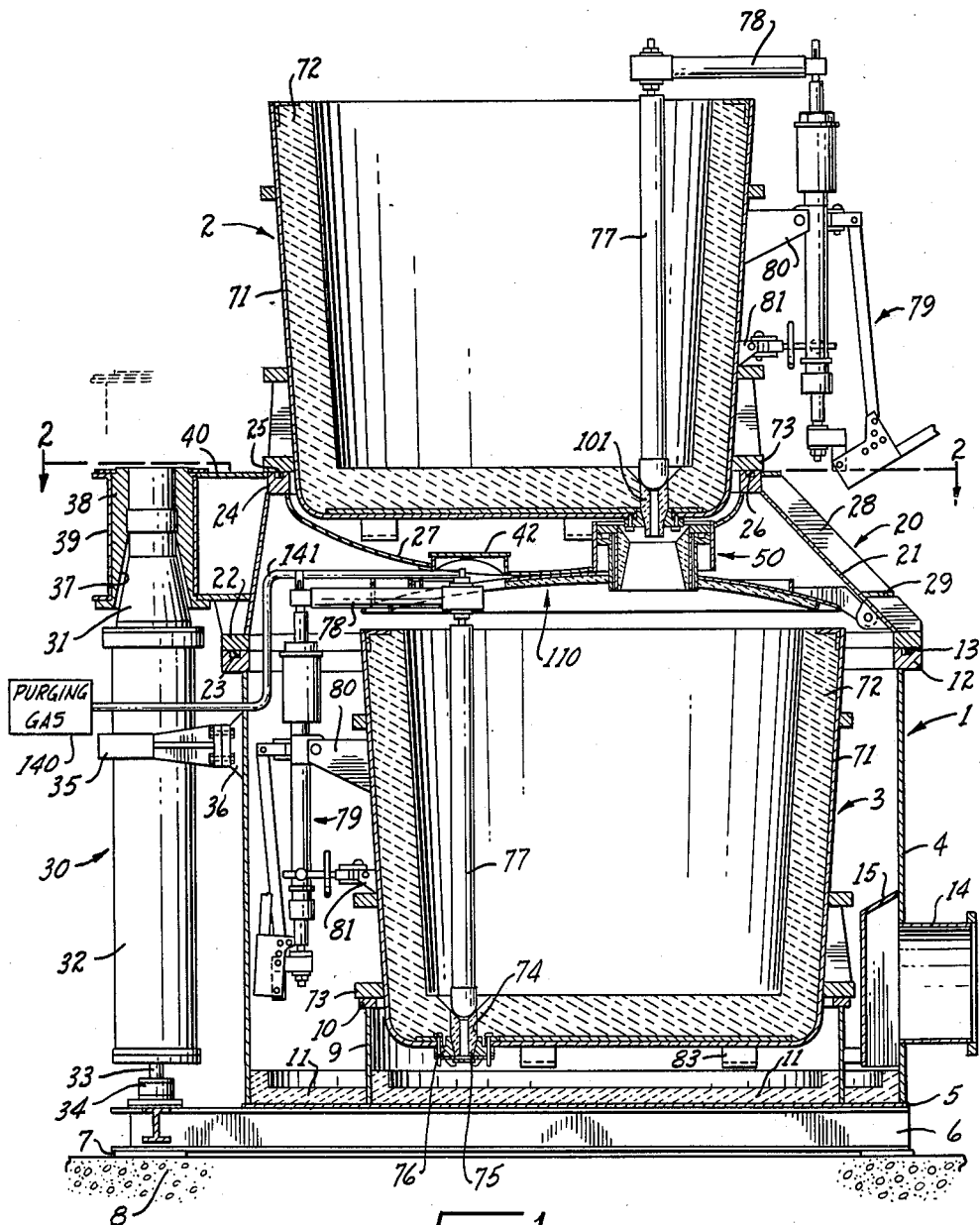
FIGURE 1 is an elevational view with parts in section and parts omitted for purposes of clarity of a combination stream and ladle vacuum degassing apparatus.

Referring now to the drawings, and in the first instance to FIGURE 1, the combination ladle and stream degassing apparatus thereshown includes a vacuum or degassing tank indicated generally at 1, a supply ladle 2, and a tank ladle 3. Tank 1 includes a side wall or shell 4 welded to bottom plate 5 which rests on a plurality of wide flange I-beams or other suitable supporting members 6. The beams in turn rest upon bearing pads 7 which are grouted to the floor 8. Floor 8 may be the bottom of a hole sunk in a foundry floor or it may be floor level depending upon the type of equipment available for handling the ladles. A tank ladle supporting skirt 9 having a flange ring 10 encircling its upper edge rises from bottom plate 5. Insulation 11 protects the bottom plate from metal spillage and excessive heat. A bearing flange 12 having a sealing channel 13 in its machined upper face is welded to the upper edge of the tank side wall. An outlet pipe 14 shown out of position in this figure for purposes of illustration connects to any suitable source of vacuum, such as a four-stage steam ejector pump. A steel skirt 15 prevents solid particles from entering the vacuum system.

A transition section indicated generally at 20, forms a cover for the tank 1 and provides a seat for supply ladle 2. The transition section or tank cover includes a cone plate 21 having upwardly inclined walls which form a lopsided frustrum of a cone. The horizontal angle of inclination of the wall on the left side of the degassing assembly is substantially greater than the wall on the right side of the assembly as viewed in FIGURES 1 and 5. This construction facilitates placement of the discharge nozzle of the supply ladle near the center of the tank ladle to thereby obtain good circulation in the tank ladle and provide maximum room for fanning out of the flowing metals as will be explained hereinafter. The bottom or tank ladle is also eccentrically positioned with respect to the center of tank 1. This off center placement provides room for the stopper rod rigging and dust separator, facilitates removal of the bale, and of course aids in the centering of the stream from the supply ladle. The bottom of the head or tank cover is welded to a bottom flange ring 22 having a machined lower face which mates with channeled flange 12. A sealing member, such as a synthetic O-ring seal 23 forms an air tight seal between the upper edge of the tank and the lower edge of the transition section.

The upper edge of cone plate 21 terminates in upper flange ring 24 which is channeled as at 25 in its machined upper face to receive a sealing member 26. An inverted head 27 extends downwardly from the lower inner edge of flange ring 24. Vertically oriented stiffeners 28 and a horizontal stiffener 29 are welded to the outside of cone plate 21. Head 27 forms the top of the vacuum chamber during ladle degassing operations, as is best seen from FIGURES 1 and 9.

Transition section 20 is raised and lowered and swung into place over the tank 1 by a lift and turn device indicated generally at 30. The lift and turn device comprises a ram 31 reciprocating in cylinder 32 supported by a stub shaft 33. Shaft 33 seats in tapered roller bearing 34 which is bolted to the base beams 6. An antifriction bearing 35 connected to bearing bracket 36 by bolts maintains cylinder 32 and consequently ram 31 exactly vertically positioned. A suitable accumulator and/or pump (not shown) provide fluid pressure for ram operation.

The ram extends into a tapered socket 37 in socket forging 38 which in turn is bolted to a cylindrical journal member 39. Journal member 39 in turn is connected to a lifting bracket or tank cover arm extension 40 welded to the transition wall 21.

The details of the transition section are shown best in FIGURES 2 and 5. An upwardly directed lip 41 extends about the periphery of inverted head 27 and is welded to the lower inner edge of flange ring 24. The curve of lip 41 is such as to provide ample clearance between the head 27 and the bottom of supply ladle 2 resting on the flange ring. A clearance hood 42 prevents interference of the upper end of the tank ladle stopper rod with the head 27 when the transition section is lowered in place. A plurality of observation windows or viewing ports 43, 44 and 45 are spaced at convenient locations about the periphery of the transition wall 21 to observe selected areas of the tank ladle. In this instance, window 43 is positioned to observe the stopper rod, window 44 the boil in the tank ladle, and window 45 the flowing stream. It will be understood that the window assemblies may be located at convenient intervals and inclined at varying angles with the horizontal. The illustrated showing is exemplary only. The stiffeners or reinforcing ribs 28, extending between the upper and lower flange rings 34 and 22, may likewise be located at any convenient interval so long as they provide additional rigidity to the transition section and insure direct transmission of the weight of the supply ladle to the tank wall 10. Head 27 is further apertured as at 47 to receive a pouring sleeve assembly, illustrated in detail in FIGURE 3 for use in stream degassing processes, and a plug, illustrated in detail in FIGURE 9 for use in ladle degassing processes.

The pouring sleeve assembly 50 provides a path for the flowing molten metal from the supply ladle to the tank ladle. It includes a housing assembly having an exterior circular wall 51 welded about its periphery to the head 27 as at 52. Exterior wall 51 is welded to a bearing ring 53 which in turn is welded to an inner housing wall 54. Wall 54 extends downwardly from the bottom inner edge of ring 53.

A removable liner assembly is indicated generally at 55. It includes an outer wall 56 welded about its upper edge to a bearing flange 57 having a machined lower face 58. Flange 57 rests on bearing ring 53. A channel 61 is formed in the upper face 59 of bearing ring 53. A suitable refractory lining 62 is secured to wall 56 by any suitable means, now shown, and tapers inwardly as at 63, and outwardly as at 64. A plurality of removable eye bolts 65 or other suitable lifting attachments make possible the removal and replacement of the liner assembly 55 when the refractory becomes worn. A reinforcing plate 67 welded to the bottom of head 27 insures an air tight joint between the outer housing wall 51 and head 27.

The tank ladle 3 consists of an outer steel wall 71 lined with a suitable refractory 72. A circular support ring 73 welded to the exterior of the ladle wall 71 near the bottom rests on flange ring 10 of the skirt 9. Suitable trunnions, not shown, are provided for lifting the ladle into and out of the tank. The bottom of the ladle is apertured as at 74 to receive a nozzle 75. A nozzle plate 76 centers and holds the nozzle 75 in place.

A purging stopper rod 77 secured to the inner end of art 78 is raised and lowered by a rigging or cylinder assembly indicated generally at 79. The assembly is secured to the exterior of the ladle by suitable brackets 80, 81. A plurality of legs 83 provide a bearing surface for the ladle when not in use.

The stopper rod itself, which is illustrated best in FIGURE 8, is preferably of the general type shown in my co-pending application Serial No. 805,927, of which this application is a continuation-in-part. The rod includes a hollow exterior refractory tube 84 which is composed of a plurality of interlocking refractory sections or sleeves 85 surrounding a gas inlet pipe 86. The sections 85 may be clay fire brick for example.

A ceramic disc 87, which may be composed of silicone carbide for example, is positioned between lowermost sleeve 85 and nozzle plug or black head 88. The black head may be composed of graphite. The black head or bottom sleeve 85, or both may not be flush against the ceramic purging disc 87 as illustrated in FIGURES 1 and 8. If there is an opening on one side or the other or both of the disc, however, it will not be so large as to permit molten metal from the ladle to flow inwardly by capillary action. Gas pipe 86 is welded at its lower end to sleeve 90 which is slotted as at 91. Stud 92 whose head 93 which is received in aperture 94 in black head 88 is fastened to sleeve 90 by any suitable means such as wedges not shown. Longitudinal bore 95 in stud 92 communicates with radial apertures 96 which are aligned with the porous ceramic purging disc 87. Although only a single porous ceramic disc has been illustrated, it will be understood that a plurality located at selected intervals may be utilized or the porous discs may be eliminated and the gas forced outwardly through the sleeves, all as indicated in my aforementioned co-pending application. A packing 97 between the gas inlet pipe and refractory tube 84 keeps the purging gas from leaking up therebetween.

A sand plate 98 is secured flush against the bottom of nozzle plate 76 by dogs 98a which are slotted as 98b to slidably receive the plate. Bolts 99 and wedges 99a passing through suitable openings in the bolts secures the nozzle plate to the bottom of the ladle. In operation the nozzle 75 is filled with sand so if the rod breaks or the black head leaks the melt will not run out.

The construction of the nozzle assembly for the supply ladle 2 is essentially the same, except the nozzle 101 may project downwardly below the nozzle plate 76, and the sand plate is of course omitted. In addition, a soft packing or insulation 102 is placed between nozzle 101 and nozzle plate 76 to prevent gas leakage. A layer of cement 103 is filled in on top of packing 102. The packing may be refractory in loose or woven form, the latter form being known by the trade name "Fibrofrax." A metal gasket 102 composed of copper forms a seal between the ladle and nozzle plate. Bolts 106 hold the nozzle plate and gasket in place.

Excessive radiation heat losses from the tank ladle are prevented by the structure illustrated best in FIGURES 4, 5, 6 and 7. In these figures, as a radiation heat shield, indicated generally at 110 is positioned directly over the tank ladle to provide a relatively short reflecting path for the radiant heat rays leaving the surface of the molten metal in the ladle. Radiation shield 110 includes a shallow dished head or shell 111 and a lower refractory lining 112. A reinforcing rib 113 extends discontinuously around the upper surface of the shell 111 to prevent excessive heat warpage and provides a base for supporting brackets to be described further in detail hereafter.

Refractory lining 112 is held in place by a plurality of bolts 126 located over the entire surface of the head 111. The edges of refractory 112 engage upwardly canted abutment ring 114 welded to the lower surface of shell 111.

The shell 111 and refractory lining 112 are apertured at 115, 116 and 117 to provide sight paths in line with observation windows 43, 44, and 45 respectively. Suitable hood 118, 119 and 120 are welded to head 111 over the apertures to provide radiation protection. The dished head and refractory lining are similarly apertured as at 47 to provide clearance for the pouring sleeve assembly 50.

The head and lining are likewise cut away in the form of a keyhole slot 121 for reception of the ladle stopper rod 77. A pair of U-shaped connecting brackets 122, 123 and a arcuate U-shaped connecting bracket 124 span the shank portion 125 of the keyhole slot to form an arch over the stopper rod extension arm 78. The reinforcing rib 113 has been partially cut out in this instance and the arcuate bracket 124 welded flush against it.

The shield is fastened to the transition section by a plurality of shield supports, two of which are indicated generally at 130 and 131.

Support 130 includes an elongated bracket 132 cut to follow the contour of the head 111 at its inner end and fastened by a loose bolt 133 to supporting bars 134, 135 at its outer end. The extreme inner edge is welded to reinforcing rib 113. The upper ends of supporting bars 134, 135 are fastened by a loose bolt 136 to support plates 137 welded to the bottom of upper flange ring 24.

Support 131 is similarly contoured to follow the outline of head 111 and welded at its inner end to reinforcing rib 113. Its outer end is connected by a loose bolt 133 to a pair of ears 138, 139 welded to the lower, inner face of cone plate 21. Suitable spacer washers 140 provide proper alignment for the bracket between the ears.

The bars 134, 135 and supports 132, 131 are so dimensioned as to maintain the radiation shield above the surface of the ladle just far enough to avoid substantial contact with splash from a boiling melt, or in other words, about the maximum height of boil of collected molten metal. By placing the shield as close as possible to the surface of the melt, its size is kept to a minimum since the radiant heat rays fan outwardly upwardly.

Figure 10:
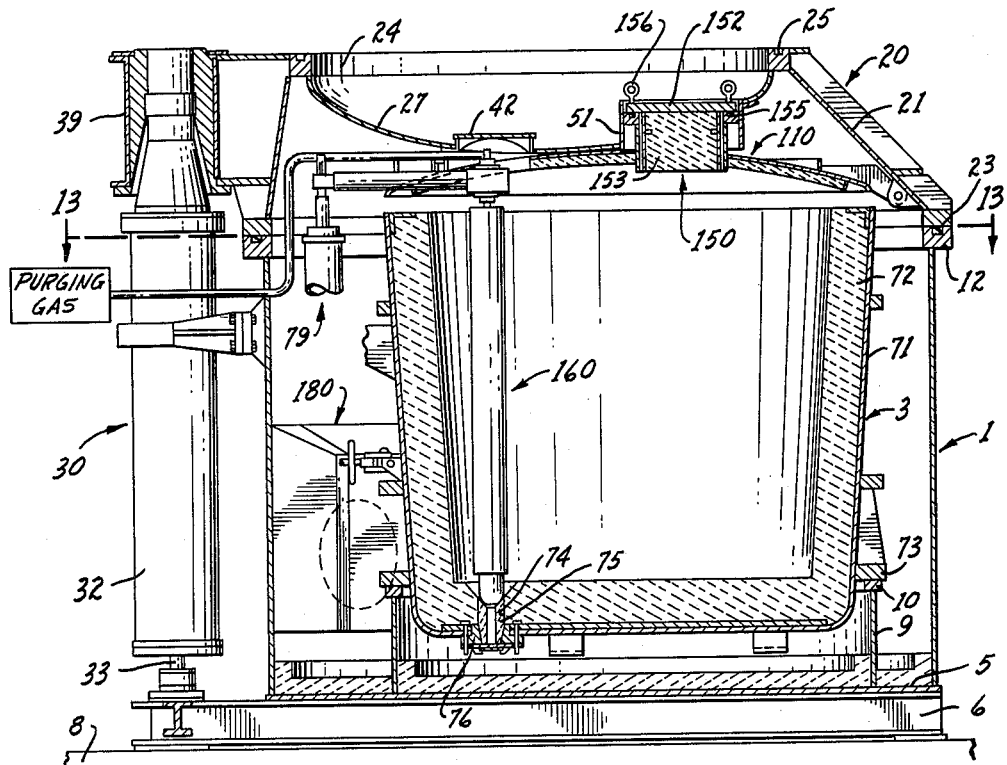
FIGURE 10 is an elevational view with parts in section and parts omitted for purposes of clarity of a ladle degassing apparatus.

In FIGURE 10, the degassing apparatus is shown set up for ladle purging only. The great versatility of the present invention can be seen from the fact that by merely replacing the pouring sleeve assembly 50 of FIGURE 3 with the plug assembly indicated generally at 150, the same basic apparatus can be utilized to perform either stream or ladle degassing processes.

Referring specifically to FIGURE 11, plug assembly 150 includes a short section of pipe 151 welded to a top plate 152. Refractory 153 is held in place within the pipe by fingers or studs 154 projecting generally radially inwardly. An O-ring gasket 155 in channel 61 seals the joint between the abutting surfaces of bearing ring 53 and top plate 152. Eye-bolts 156 or any other suitable lifting means permits the entire plug assembly 50 to be easily and quickly removed for conversion to stream degassing.

Figure 12:
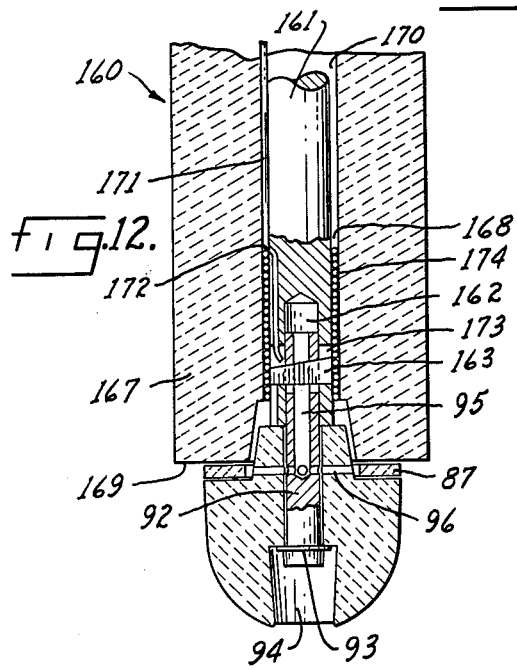
FIGURE 12 is a detailed sectional view to an enlarged scale of a purging stopper rod.

A novel purging stopper rod is indicated generally at 160 in FIGURE 10, and illustrated in detail in FIGURE 12. In this embodiment, the hollow gas inlet pipe 86 in FIGURE 8 has been replaced by a solid bar 161 which extends the length of the rod. The lower end of bar 161 has been reamed out as at 162 to receive the stud 92. Key 163 passing through suitable keyways in the stud and bar secure the stud to the bar. A longitudinal bore 95 terminates in radial aperatures 96 which are aligned with a purging disc 87. The disk 87 may be composed of silicone carbide or any other suitable refractory which is porous enough to permit outflow of gas under pressure, but dense enough to prevent inflow of the molten metal. Head 93 of stud 92 bears against the base surface of recess 94 in black head 88 to prevent any looseness between bar 161 and the head.

A plurality of tubular sleeves 167 having internal bores 168 all surround the bar 161 to protect the metal bar and stud from the radiant of the melt. In this instance, the refractory sleeves are considerably thicker than those illustrated in FIGURE 8. This added thickness not only protects the metal bar and stud from radiant heat, but the overhand, indicated at 169, helps direct the bubbles of purging gas passing through disc 87 radiantly outwardly into the melt the additional radial dispersion of bubbles produces a greater agitation in the melt than can be obtained with the rod of FIGURE 8.

The bores 168 in sleeves 167, which are slightly larger than bar 161, provide a clearance 170 between the bar and sleeves. A small copper tube, or gas pipe 171 is positioned in this clearance space, and its bottom end is bent inwardly and downwardly as at 172 to lie flush along a keyway, not membered, cut in the bottom end of the bar. The pipe discharges into keyway 173 in bar 161. Pliable refractory insulation 174 is wrapped around the bottom end of bar 161 and into snug engagement with the bend 172 to prevent escape of gas upwardly between the sleeves 167 and bar 161. With this arrangement purging gas which is discharged under pressure from pipe 171 passes upwardly between stud 92 and the walls of hold 162 into the space above the stud then downwardly through the bore 95, and finally outwardly into the melt through radial apertures 96 and purging disc 87.

A dust separator for removing the heavy particles from the exhaust gases in tank 1 is indicated generally at 180 in FIGURE 10 and illustrated in detail in FIGURES 13 and 14. The separator comprises three sections, indicated generally at 181, 182 and 183, welded to the inside of tank 1. Section 181 includes top plate 184, side plate 185, front plate 186 and is open at the bottom to provide an inlet for the exhaust gases. Top plate 187 and front plate 188 of center section 182 are welded to the adjacent top and front plates of section 181. Top and front plates 189 and 190 of section 183 which is open at the bottom are likewise welded to the corresponding plates of section 182. Side plate 186 is of substantially the same shape as plate 186. Section 181 is somewhat smaller than section 183 to provide room for the stopper rigging 79, as best illustrated in FIGURE 13.

A bottom plate 191 closes senter section 182, and a pair of interior baffle plates 192 and 193 extend upwardly along the joint between the center and side sections. The baffle plates or partitions prevent side ways suck of the air as it enters the bottom openings of the separator. By insuring a 180° reversal of the direction of air flow, the heavy particles in the exhaust gases are thrown downwardly by centrifugal force. A clean out door 194 in front plate 188 provides access to the interior of the separator. A collar 195 surrounds discharge opening 196 and is adapted for connection to any suitable exhaust apparatus, such as a multiple stage steam ejector system.

The use and operation of the invention is as follows:

One of the more important methods of degassing molten metals is to subject a flowing stream of molten metal to vacuum conditions. Included deleterious gases such as oxygen, nitrogen and hydrogen are thus able to migrate to the surface of the flowing droplets and escape outwardly into the surrounding vacuum.

In effect, the droplets explode because the gas pressure within the droplets is higher than the atmosphere surrounding each droplet. The greater the pressure differential, the more violent these explosions become.

In order to promote the outward escape of the gases, it is highly desirable to fan out the stream of flowing metal into a spray comprising a large number of small droplets. In this manner, the largest surface area is exposed to the vacuum condition. One of the best ways of achieving this spray effect is to elevate a ladle of molten metal a substantial height above another ladle and draw a vacuum around the lower ladle and that area surrounding the stream of flowing metal between the ladles. Processes in which this effect is achieved are generally referred to as stream degassing processes.

Generally, however, as shown in the De Mare patent mentioned earlier, the height is so great that most, if not all, of the degassing is a result of the exposure of the droplets to the vacuum. The removal of this great bulk of the gases which are inherently removable from the stream requires high head room and the addition of external heat to prevent the metal from exceeding its permissible temperature drop, as shown in the De Mare patent.

To practice the modified stream degassing process with the structure of the present invention the transition section 20 is lifted to the phantom line position of FIGURE 1 by the ram and cylinder assembly 31, 32, and swung radially about stub shaft 33 as a pivot by a suitable horizontally axised piston and cylinder (not shown) acting against arm extension 40. The tank ladle 3 is then positioned within tank 1 with its support ring 73 resting on flange ring 15 carried by circular skirt member 19.

Once the tank ladle has been properly positioned, the transition section is swung into vertical alignment over it in the elevated position. Hydraulic fluid is then withdrawn from the cylinder 32 and the transition section settles downwardly until the bottom flange ring 22 rests on flange 12. The O-ring seal 23 forms an air tight joint between the two flanges. The inverted head 27 and wall 21 of the transition section are welded to the bearing ring 24 to prevent egress of the air at these joints.

The supply ladle 2 is then swung into position on the transition section upper bearing ring 24. Ladle flange ring 73 forms an air tight seal with the bearing ring 24 of the transition section by means of O-ring seal 26. Soft packing 102 around the discharge nozzle 101, metal gasket 105 between the nozzle plate 76 and tank shell 71, and the molten metal in the supply ladle form a seal at the pouring sleeve assembly.

The vacuum system is then turned on and the air evacuated from tank 3 and transition section 20 through conduit 14. Dust shield or filter 15 prevents droplets of molten metal and other solid particles from entering and fouling the vacuum pump system.

When a sufficiently low vacuum value is reached, the supply ladle stopper rod 77 is lifted by means of stopper rigging 79 and metal falls downwardly through the supply ladle discharge nozzle 75, through the passage in the pouring sleeve assembly, and on down into tank ladle 3.

The refractory lining 62 in the pouring sleeve assembly liner is tapered or flared outwardly, downwardly as at 64. This contour facilitates the rapid outward fanning of the flowing metal stream into a fine spray of individual droplets. These small droplets expose a maximum amount of metal surface area to the vacuum and facilitates diffusion outwardly of the included deleterious gases from the metal into the surrounding vacuum.

The unique sealing arrangement formed between the bottom of the supply ladle 2 and the upper portion of the transition section eliminates the need for the conventional rupture assemblies. In conventional installations, a thin rupture disc, usually an aluminum plate having a thickness on the order of .025 inch is placed across the passage in the pouring sleeve assembly and the tank pumped down using this thin disc as a seal. The first impact of the molten metal from the supply ladle ruptures the disc. This procedure may give poor results because the aluminum may be added to the refined metal as an alloying element whether desired or not, and the downwardly flowing metal is apt to draw in surrounding gases if a tight seal has not been formed between the bottom of the supply ladle and the top of the nozzle assembly. In addition, the conventional rupture disc assembly is very costly compared to the present structure, and is only with difficulty maintained vacuum tight due to erosion of the disc seat.

The construction of the refractory lining in the nozzle assembly is also unique. Since it need not form a constriction near the bottom of the passage as is the case in conventional installations, it has been so contoured as to aid in the outward fanning of the stream of molten metal, thus positively dispersing the droplets in the stream.

Once the metal reaches the tank ladle 3 it may be further treated by the apparatus illustrated best in FIGURES 1 and 8. As soon as the short depth of metal is obtained in the tank ladle, purging gas from a suitable source of supply 140 is passed into the rising melt through conduit 141, and the porous tank ladle stopper rod 77. The purging gas generally will be admitted near the bottom of the ladle as through purging disc 87 and bubbles upwardly to the top of the melt where it is released to the vacuum. As the bubbles travel upwardly, additional included gases that were not removed during the stream degassing phase of the operation migrate into the bubbles and are released when they reach the surface. In addition to the actual migration of gases into the purging gas, the bubbles create a circulating effect in the tank ladle which brings metal near the bottom of the ladle upwardly to the top in a continuing cycling process. Since the top of the melt in the tank ladle is continually exposed to the vacuum, the maximum opportunity for the gases to migrate into the vacuum are provided.

The great versatility of the invention is illustrated with reference to FIGURE 10. To form a vacuum chamber for practicing ladle degassing, either with a vacuum alone or with a vacuum in combination with a purging gas, it is only necessary to replace the pouring sleeve line 55 of FIGURE 3 with the plug assembly 150 of FIGURE 11. The equipment can thus be kept continually in use.

Another unique advantage of the structure of the present invention is the fact that radiant heat losses within the ladle are kept very low. This is accomplished by placing the radiation shield 110 very close to the top of the melt since the amount of radiant heat loss will be roughly proportional to the distance between the top of the melt and a reflecting surface, in this instance the shield. As a practical matter, the limiting distance will be that height below which there is substantial splatter of the melt onto the shield. Further, by making the shield small, its mass is reduced, and consequently its ability to absorb and retain heat is reduced. As the shield heats up to the temperature of the melt, which it does rather quickly because of its low mass, the temperature differential between the shield and the melt is slight, and, of course, the smaller the temperature differential, the smaller the heat loss.

To ladle or ingot degas, the pouring sleeve assembly is merely replaced with plug assembly 150. If ladle degassing, purging gas may be admitted through the stopper rod, as illustrated in FIGURES 8 and 12, and if ingot degassing, purging gas may be admitted by a snorkel tube extending downwardly into the melt.

In summary, this invention enables either stream degassing or ladle degassing processes to be practiced either simultaneously or separately. In a combination process, the metal is first exposed to the vacuum as it passes through the pouring sleeve assembly. The contour of the liner in the pouring sleeve assembly increases the dispersion of the stream to a greater extent than any now known process. In view of the relatively short distance between the ladles, only a portion of the included gases inherently removable by the vacuum during the streaming phase may be removed. The top of the melt in the tank ladle formed by freshly admitted stream metal is also exposed to the vacuum. Once the metal has been admitted to the tank ladle, that metal adjacent the tank ladle stopper rod is subjected to the purging action of the purging gases diffused outwardly from the stopper rod and upwardly through the melt. At the same time metal in areas remote from the stopper rod in the tank ladle is circulated upwardly to the surface of the rising metal level in the tank ladle and again exposed to vacuum, whereby degassing in further promoted.

Although the invention has been described primarily in connection with ladle degassing, the apparatus and process described herein are likewise adaptable to ingot or ingot stream degassing.

The foregoing description is illustrative only and not definitive. Accordingly, the invention should not be limited except by the scope of the following claims.

I claim:

1. A method of removing deleterious gases from molten ferrous metal, said method including the steps of
   exposing a downwardly passing stream of the molten metal to a vacuum sufficiently low to remove deleterious gases therefrom,
   said molten metal passing downwardly a distance sufficient to remove a significant portion, less than all, of the total quantity of deleterious gases removable from the downwardly passing stream by said vacuum,
   collecting the molten metal under vacuum, and
   passing a purging agent upwardly through the collected molten metal under a vacuum sufficiently low to remove an additional portion of the deleterious gases remaining in the metal after the downwardly passing stream has been exposed to the vacuum.

2. The method of claim 1 further characterized in that the step of passing the purging agent upwardly through the molten metal overlaps the step of exposing the downwardly passing stream to the vacuum.

3. The method of claim 1 further characterized by and including the step of providing an inert atmosphere about the molten metal at the conclusion of the gas removing steps to thereby reduce the danger of explosion.

4. The method of claim 1 further characterized in that the downwardly passing stream of molten metal is directly outwardly as it passes downwardly.

5. The method of claim 1 further including the steps of forming a seal between a receptacle containing the undegassed molten metal and a confined space in which the downwardly passing stream from the receptacle is to be exposed to vacuum prior to initiation of contact of the stream with the vacuum to thereby enable the undegassed stream of molten metal to flow uninterruptedly into the confined space after a vacuum is drawn, and maintaining said seal during the downward passage of said molten metal.

6. The method of claim 1 further including the step of reducing the temperature differential between the collected molten metal and its surroundings and thereby the heat loss therefrom, by intercepting the radiant heat from a substantial area of the upper surface of the collected molten metal.

7. The method of claim 1 further characterized in that the distance the downwardly passing stream of molten metal travels is a distance insufficient to cause the molten metal to exceed its permissible temperature drop over the process.

8. The method of claim 7 further characterized in that the distance is slightly greater than the maximum height of boil of the collected metal.

9. The method of claim 1 further characterized in that the purging agent is passed upwardly through the bottom portion of a receptacle containing the collected molten metal.

10. The method of claim 1 further characterized in that the purging agent is admitted to the collected molten metal through an admission conduit immersed therein at a point substantially below the surface thereof.

11. A method of removing deleterious gases from molten ferrous metal, said method including the steps of forming a seal between a first upper ladle containing undegassed molten ferrous metal and a confined space within which is located a second collecting ladle, passing a downwardly directed stream of molten metal from the upper ladle through a radiant heat intercepting shield located immediately therebelow and into the lower ladle, said radiant heat intercepting shield being located above the second ladle a distance slightly greater than the maximum height of boil of the molten metal in the second ladle after it is collected therein, drawing a vacuum sufficiently low to effectively degas the molten metal about the downwardly passing stream and above the second ladle simultaneously, to thereby remove a significant portion, less than all, of the total quantity of deleterious gases removable from the downwardly passing stream, fanning the downwardly passing stream of undegassed molten metal outwardly as soon as the stream passed through the radiant heat intercepting shield to thereby provide maximum exposure of the downwardly passing stream to the vacuum, collecting the downwardly passing stream in the second ladle and exposing the upper surface of the collected metal to the vacuum as the second ladle is filled, passing a purging agent upwardly through the molten metal in the second ladle to thereby remove an additional portion of the deleterious gases, creating a non-explosive atmosphere above the collected molten metal prior to exposure of said collected molten metal to atmosphere, and, thereafter pouring the degassed molten metal.

References Cited in the file of this patent

UNITED STATES PATENTS

| | | |
|---|---|---|
| 551,704 | Younger | Dec 17, 1895 |
| 1,320,386 | Griggs | Nov. 4, 1919 |
| 1,555,313 | Rohn | Sept. 29, 1925 |
| 1,792,967 | Clark | Feb. 17, 1931 |
| 1,921,060 | Williams | Aug. 8, 1933 |
| 2,253,421 | De Mare | Aug. 19, 1941 |
| 2,290,961 | Heur | July 28, 1942 |
| 2,587,793 | Waldron | Mar. 4, 1952 |
| 2,784,961 | Coupette et al. | Mar. 12, 1957 |
| 2,826,489 | Wagner | Mar. 11, 1958 |
| 2,837,790 | Rozian | June 10, 1958 |
| 2,852,246 | Janco | Sept. 16, 1958 |
| 2,893,715 | Harders | July 7, 1959 |
| 2,893,860 | Lorenz | July 7, 1959 |
| 2,906,521 | Harders | Sept. 29, 1959 |

FOREIGN PATENTS

| | | |
|---|---|---|
| 404,518 | Great Britain | Jan. 18, 1934 |
| 1,146,218 | France | Nov. 7, 1957 |